United States Patent [19]

Kim

[11] Patent Number: 4,863,366
[45] Date of Patent: Sep. 5, 1989

[54] FEED UNIT FOR AN EXTRUDER

[75] Inventor: Heung-Tai Kim, Bay Village, Ohio

[73] Assignee: The B. F. Goodrich Company, Akron, Ohio

[21] Appl. No.: 203,834

[22] Filed: Jun. 8, 1988

[51] Int. Cl.$^4$ .................. B29C 47/10; B29C 47/36; B29B 7/60

[52] U.S. Cl. .................. 425/376.1; 425/205; 425/209; 425/377; 264/211.21; 264/349

[58] Field of Search .................. 425/205–209, 425/381.2, 376.1, 377, 378.1, 381, 382.4, 145, 147, 154; 264/211–221, 169, 349; 366/80, 302, 307, 336–338, 78, 79, 81

[56] References Cited

U.S. PATENT DOCUMENTS

| | | | |
|---|---|---|---|
| 2,947,030 | 8/1960 | Varn | 425/208 |
| 3,310,835 | 3/1967 | Morozov et al. | 425/381.2 |
| 3,386,131 | 6/1968 | Vanzo | 425/378.1 |
| 3,496,603 | 2/1970 | Listner et al. | 425/208 |
| 3,744,770 | 7/1973 | Ocker et al. | 366/82 |
| 3,790,328 | 2/1974 | Maxwell | 425/381.2 |
| 4,431,105 | 4/1984 | Meeker et al. | 198/523 |
| 4,448,736 | 5/1984 | Emery et al. | 264/40.1 |

FOREIGN PATENT DOCUMENTS 737100  1/1970  Belgium .................. 425/381.2

*Primary Examiner*—Jeffery Thurlow
*Assistant Examiner*—Mathieu Vargot
*Attorney, Agent, or Firm*—Joseph Januszkiewicz

[57] ABSTRACT

An extruder having a barrel with a central passageway, which passageway journals a single rotating extruder screw with flight thereon. The extruder screw has a feed section, a transition section and a metering section with the metering section discharging the extruder melt. The extruder barrel has an opening at the feed section that receives a deflector member that is located between such opening and the hopper that receives the plastic material to be processed for feeding into the central passageway for conveyance and working by the extruder screw. The deflector member has a progressively restrictive inlet that cooperates with the flights of the extruder screw to draw in the plastic material fed thereinto.

7 Claims, 5 Drawing Sheets

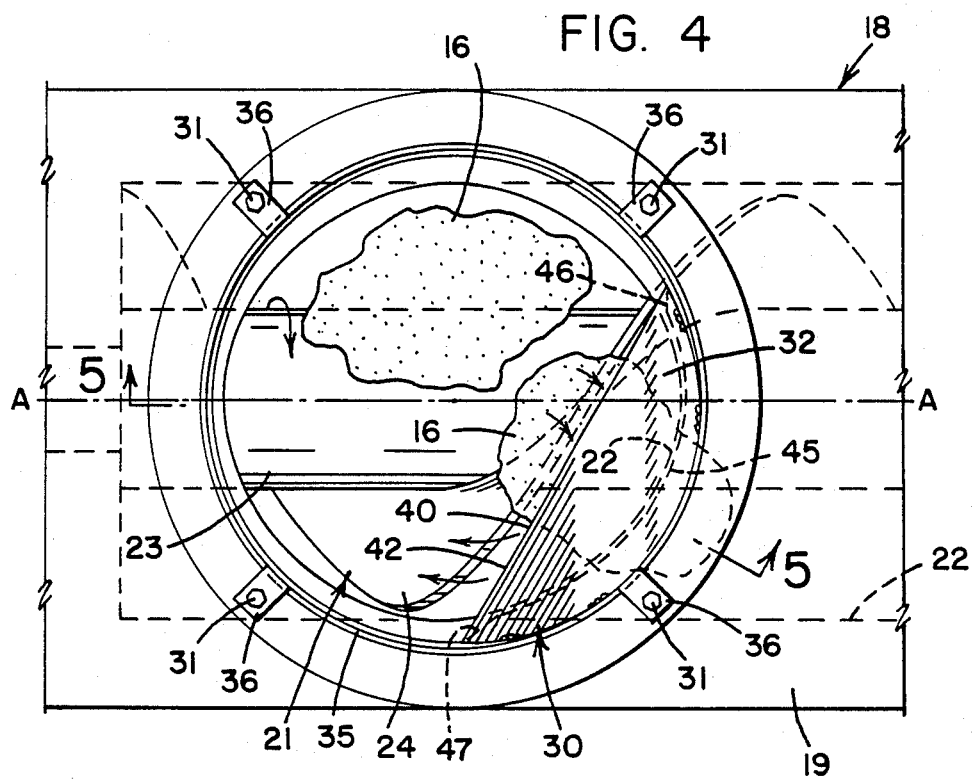
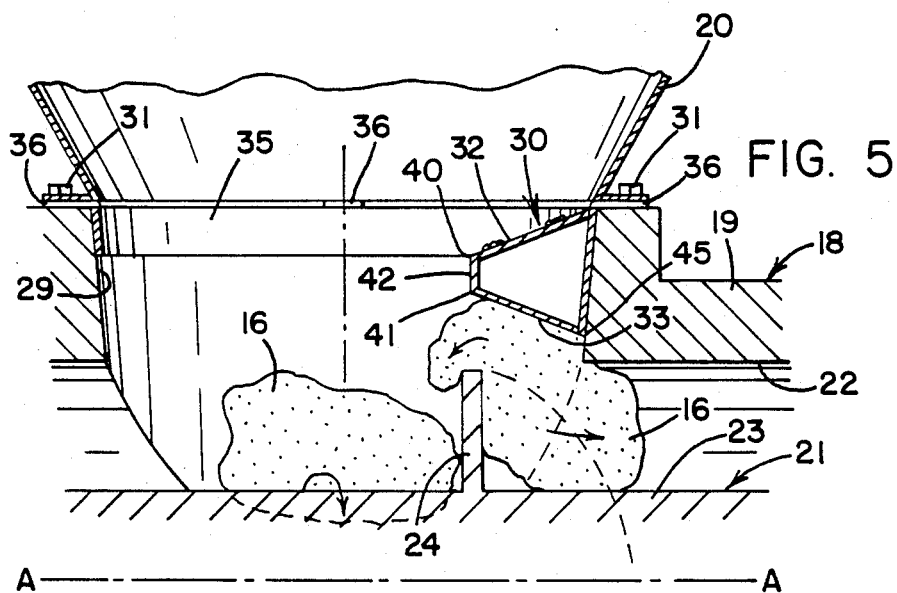

FEED UNIT FOR AN EXTRUDER

BACKGROUND OF THE INVENTION

This invention relates to an extruder and more particularly to a new and improved means for feeding material into and through an extruder to improve its efficiency.

Plastic materials in the form of pellets, granules, and buns and or globs of hot melt plastic materials are generally fed via gravity to the hopper of a pelletizing extruder wherein the hopper is mounted on an opening communicating with the central cylindrical passageway of an extruder where the rotating extruder screw is located. The hopper feeds or directs the plastic material into the extruder where the extruder screw plasticates, works, and melts the material into a homogenous melt for discharge therefrom and subsequent cooling and pelletizing into small cubes. In this process, mixers are often employed to preliminarily mix and plasticate the material for discharge into the hopper of the pelletizing extruder as globs or buns of hot melt to assure a better mixing process. In this latter instance, the globs of hot plastic material are often deflected outwardly away or back into the hopper rather than be accepted by the clearance space between the cylindrical barrel wall and the flights of the rotating screws. Heretofore solutions to this problem included the provision of modifying the structural portion of the extruder barrel adjacent to the hopper to provide a larger chamber on the side within the barrel itself to receive the hot melt or to also include in such feed section of the barrel an auxiliary feed screw to cooperate with the main feed screw to aid in the conveying of the hot melt or plastic material. In these instances, the cost is extremely high and renders such modified extruders to limited special uses. Another solution to this problem is to rotate the extruder screw at a much higher speed to push the hot melt forward. Such higher screw feed puts an unnecessary shear heat into the compound, overheating the compound, which results in a poor quality product. These solutions are very expensive. Applicant in his structure provides a deflector plate between the hopper and the extruder barrel opening that communicates with the central passageway to eliminate the need to structurally change the normal extruder barrel or provide a new extruder barrel while doing so with a minimum of cost. Hot melt as used herein refers to plastic materials or mixtures of plastic materials that are pliable and have properties that are putty like in nature as between the state of being a solid and a liquid. Buns or globs of hot melt are much larger in size than cubes or granules of PVC and are lumpish usually rounded masses of usually larger size as about the size of a human's fist.

SUMMARY OF THE INVENTION

The present invention is directed to an extruder having a barrel with a central passageway therethrough which journals a single rotating extruder screw with flight therein. Such extruder screw has a feed section, a transition section and a metering section with the metering section discharging the extruder melt. The barrel at the feed section has an opening that receives a deflector member or deflector means that is located between such opening and the hopper that receives the plastic material to be processed for feeding into the central passageway for conveyance and working by the extruder screw. The reflector member or deflector means has a progressively restrictive inlet that cooperates with the flights of the extruder screw to draw in the plastic material fed thereinto.

BRIEF DESCRIPTION OF THE DRAWINGS

FIG. 4 is a plan view of the deflector member mounted on the extruder as in FIG. 2 without the hopper showing the feed screw and the flights of such feed screw working the hot melt globs of plastic;

FIG. 5 is a cross sectional view of the deflector member and a portion of the barrel and feed screw adjacent thereto taken on line 5—5 of FIG. 4 but showing the lower portion of the hopper;

DESCRIPTION OF THE PREFERRED EMBODIMENT

Figure 1:
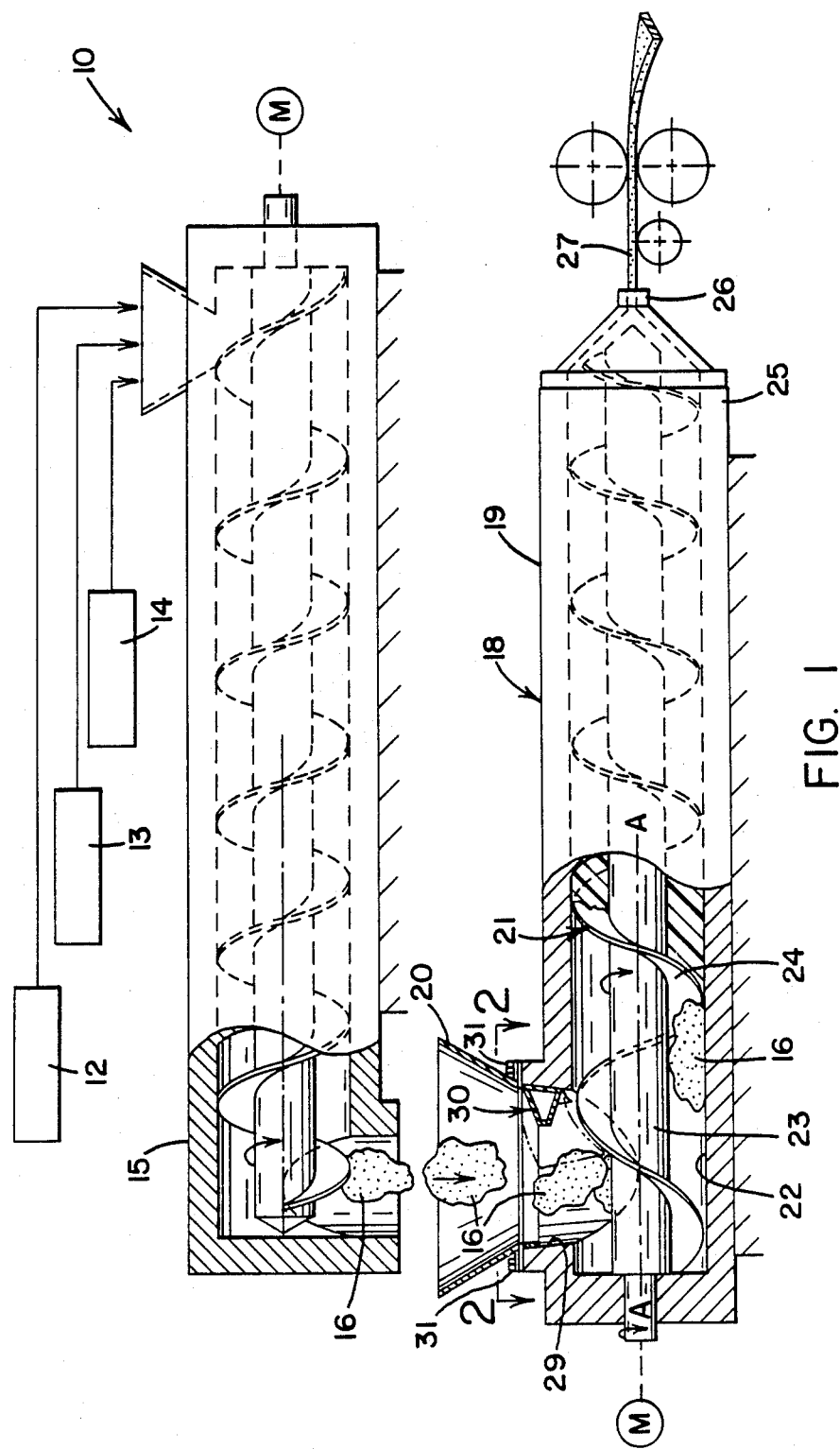
FIG. 1 is a block diagram of the feeders for a continuous mixer and extruder which mixer and extruder are shown in side elevational view with portions of the barrel broken away to show the feed screw therein with a deflector member mounted therein; such extruder has a hopper mounted thereon.

Referring now to the drawings, wherein like reference numerals designate like or corresponding parts throughout the several views, there is shown in FIG. 1 a feeder, mixer and extruder system 10 which includes a plurality of feeders schematically shown as 12, 13 and 14 for feeding the raw materials to a mixer 15. The feeders 12, 13 and 14 are illustrative only and may include additional feeders which deliver the ingredients to the mixer which preliminarily mixes the plastic material into a hot melt for discharge as hot globs 16 of plastic mix to a hot melt pelletizer extruder 18.

The extruder 18 has a barrel 19, hopper 20 and an extruder feed screw 21 suitably journaled in central passageway 22 of such barrel, driven by a motor. Such feed screw 21 has a longitudinally extending core 23 and a single helical flight 24, although additional flights may be provided. Such hot melt is processed by the extruder screw 21 for discharge from one end 25 of the extruder through a die 26 which in the example shown discharges the hot melt as a single wide band of extrudate 27. The other end of the extruder has an opening 29 upon which is mounted a deflector plate or deflector member 30. The hopper 20 is mounted on deflector member 30 and attached to the extruder barrel by bolts 31, which bolts 31 interconnect the hopper and the deflector member onto the extruder.

Figure 3:
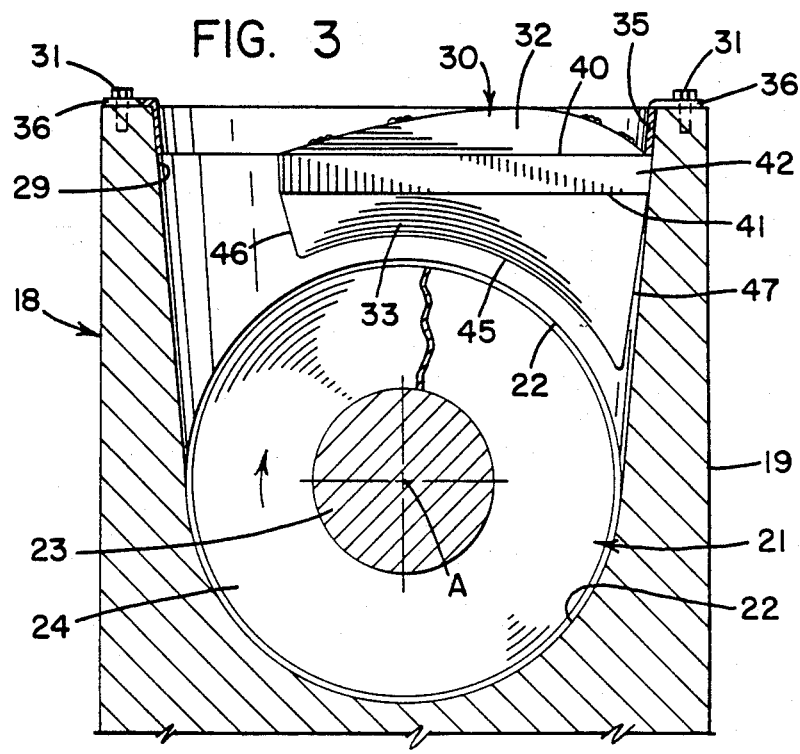
FIG. 3 is a cross sectional view of the extruder and feed screw taken on line 3—3 of FIG. 2 disclosing the deflector member in front elevational view without the hopper.
Figure 8:
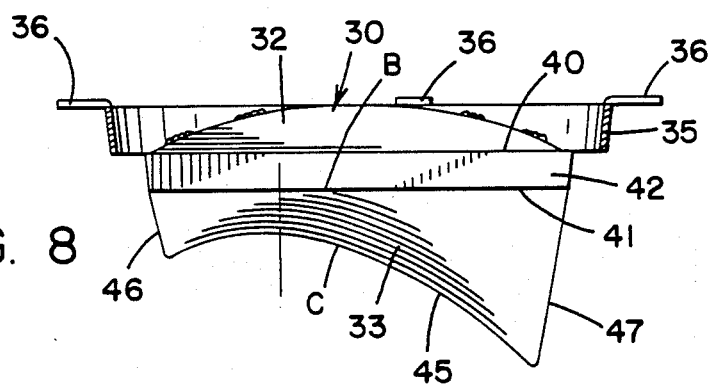
FIG. 8 is a cross sectional view of the deflector member taken on line 8—8 of FIG. 6.
Figure 10:
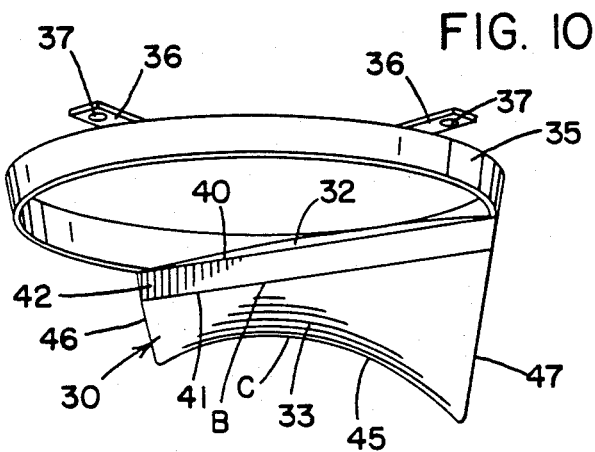
FIG. 10 is a perspective view of the deflector member as shown in FIG. 9.

The deflector plate or deflector member 30 has an upper inclined portion 32 and a bottom inclined portion 33 that is arcuate in configuration (FIGS. 3, 8 and 10). Such inclined portions 33 and 32 are suitably connected to an annular ring 35, which ring 35 has a plurality of circumferentially spaced tabs 36, with a bore 37 in each tab 36. Such tabs 36 and their bores 37 facilitate the securing of the deflector member or plate 30 to the extruder opening 29 as seen in FIGS. 5 and 1.

Figure 6:
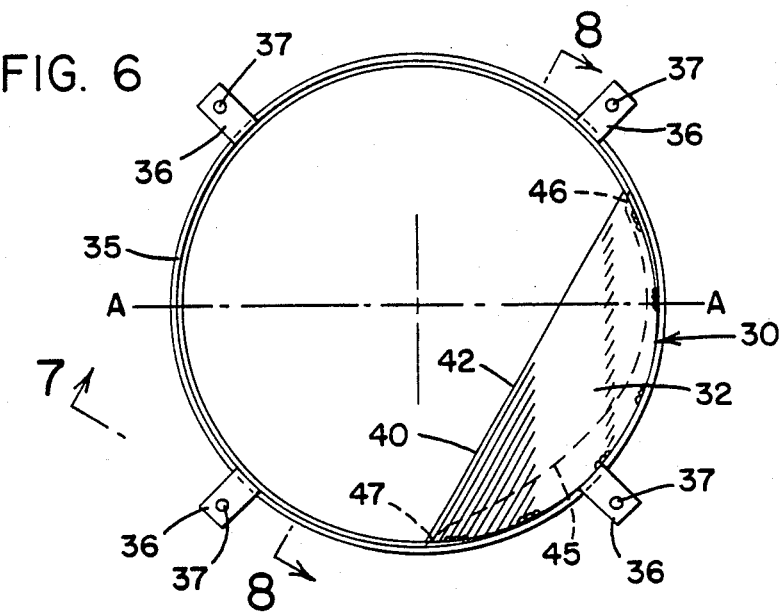
FIG. 6 is a plan view of the deflector member.
Figure 7:
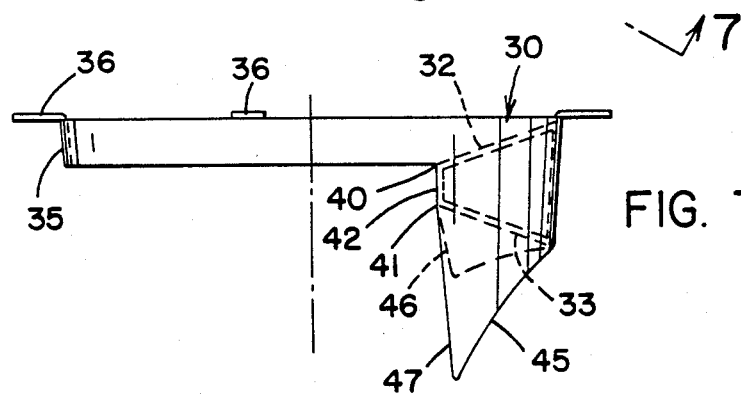
FIG. 7 is a side elevational view of the deflector member taken on line 7—7 of FIG. 6.

As viewed in FIG. 6, the upper inclined portion 32 terminates into a linear edge 40. As viewed in FIGS. 3 and 8 the bottom inclined arcuate portion 33 of deflector member 30 terminates into a linear edge 41 which defines a planar surface 42 between edges 40 and 41. Such edges and the planar surface are not critical to the invention and may be varied in configuration.

Figure 2:
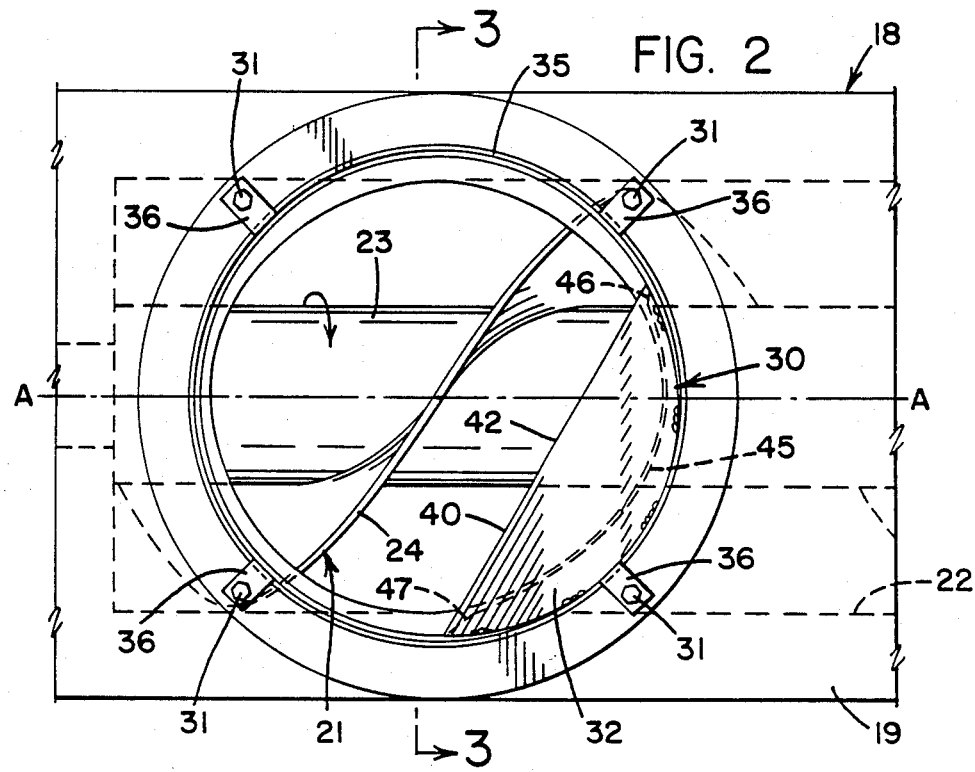
FIG. 2 is a plan view of the deflector member and part of the extruder barrel taken on line 2—2 of FIG. 1 without the hopper for clarity.

The deflector plate 30, as viewed from the front as seen in FIGS. 3, 8 and 10 terminates into an arcuate edge 45 with two side portions 46 and 47. As seen in front elevational view of FIG. 3, the deflector plate side portions extend from the 11 o'clock position to the two o'clock position and with the arcuate edge 45 substantially following the circumference of the outer edges of the flights 24 but spaced therefrom. The longitudinal center line of the central passageway 22 of barrel 19 is designated A—A in FIG. 2. The defector member 30 is angularly disposed relative to the longitudinal center line A—A as seen in FIGS. 2 and 6 such that a vertical plane containing center line A—A intersects the deflector member 30 such that the majority of the deflector member lies to that side of the center line A—A in which the adjacent upper portion of the screw flights rotate (which in FIG. 3 is to the right). In plan view the deflector plate extends between the 11 o'clock to the 3 o'clock position using the center line A—A as a frame of reference. Hereinafter as used, the plane that is the perpendicular bisector of the linear edge 40 and 41 makes an acute angle with the vertical plane containing line A—A wherein only the downstream portion of such line A—A is used. With this terminology and meaning is the statement that the perpendicular bisector of the forward edges of the deflector plane makes an acute angle with the downstream portion of the central axis.

Figure 9:
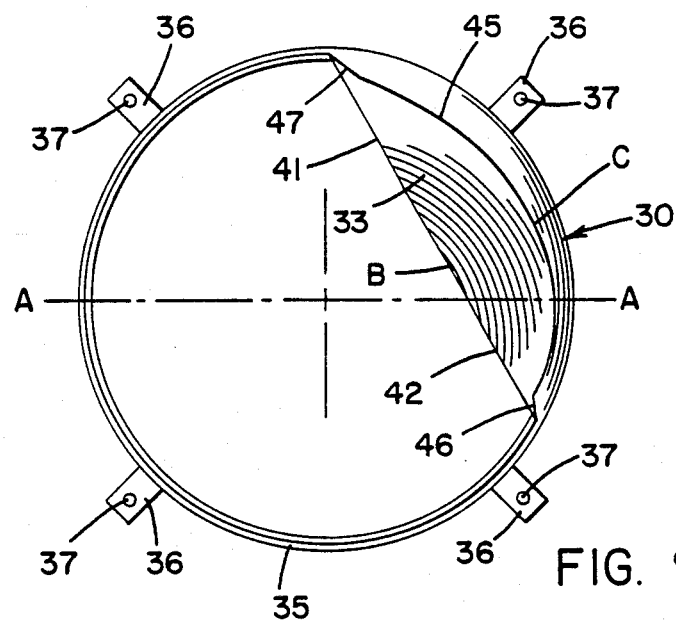
FIG. 9 is a plan view of the deflector member identical to the member shown in FIG. 6 above but with the deflector member inverted to show the arcuate nature of the bottom portion thereof.

In viewing the underside of the deflector plate as in plan view (FIG. 9), the greatest arcuate recess distance beginning along the forwardly most portion, adjacent to linear line 41, midway between the respective side portions 46 and 47 starting at point B in FIG. 9. Such arcuate recess in the underside portion progressively gets shallower as it approaches point C on arcuate edge 45. Point C is considered to be midway on arcuate edge 45.

In the operation of the above described apparatus, the respective feeders 12 through 14 feed the raw materials to a mixer 15, which plasticates the materials and discharges globs or buns of hot plastic melt into the hopper 20 for reception by the central passageway of the extruder 18. As the globs of hot plastic melt material is dropped into the hopper, some globs drop onto the upper inclined surface 32 of the deflector plate and rolls into the opening 29 on the extruder and is engaged by the flights 24 of the feed screw 21. Other globs of material drop into the opening 29 without hitting the deflector plate 30. In all instances however as evidenced by the showing in FIG. 1, the globs are worked on by the flights 24 in cooperation with the core 23 and the arcuate inclined portion 33 of the deflector plate 30. The arcuately recessed portion of such bottom surface of deflector plate 30 aids in the captively feeding of the globs forwardly by the flights of the extruder screw. Initially there is a greater clearance between the flights and the forward portion of the deflector plate and as the flights of the feed screw rotate and move the globs downstream, the deflector plate's underside provides a reduction in the clearance space as the arcuate recess on the underside portion of the deflector plate becomes smaller in depth as explained above. This action facilitates the forward movement of the globs and the working action on the hot globs of plastic material. It should be noted that FIG. 1 shows only a few glob of material in the initial feed section of the extruder 18 for clarity sake to better illustrate the inter-relationship of parts.

Various modifications are contemplated and may obviously be resorted to by those skilled in the art without departing from the described invention, as hereinafter defined by the appended claims, as only a preferred embodiment thereof has been described.

I claim:

1. An extruder apparatus having a longitudinally extending barrel with a central passageway therethrough, a feed screw with flights thereon rotatably journaled in said passageway for feeding and working plastic material therein, a discharge end at one end of said barrel, an opening at the other end of said barrel communicating with said central passageway and said flights of said extruder screw, a hopper mounted on said barrel communicating with said opening for receiving plastic materials for working in said extruder, a deflector member mounted on said extruder within said opening adjacent to the lower portion of said hopper, said deflector member having an upper inclined portion that deflects plastic materials deposited thereon into said opening and said central passageway, said deflector member on the opposite side of said upper inclined portion having a bottom inclined portion that cooperates with said flights as they rotate to direct plastic materials into said central passageway.

2. An extruder apparatus as set forth in claim 1 wherein said bottom inclined portions tapers in a direction of said one end of said barrel and defines a decrease in volume in its volumetric size in said direction.

3. An extruder apparatus as set forth in claim 2 wherein said central passageway of said barrel has a longitudinal center line, said discharge end being a downstream end and said other end being an upstream end, said deflector member having a forwardly disposed edge that lies closely adjacent the merging of the inclines of said upper inclined portion and the bottom inclined portions, said forwardly disposed edge of said deflector member is also defined as that portion facing the upstream end of said extruder barrel, and a vertical plane bisecting said forwardly disposed edge makes an acute angle with said downstream center line.

4. An extruder apparatus as set forth in claim 2 wherein said bottom inclined portion tapers arcuately to provide said decrease in volume size in said direction of said end of said barrel.

5. An extruder apparatus as set forth in claim 3 wherein the upper portion of said flights in plan view are inclined in the same general direction as said forwardly disposed edge of said deflector member.

6. An extruder apparatus as set forth in claim 5 wherein said bottom portion of said deflector member has a circumferential profile that extends in an arcuate path.

7. An extruder apparatus as set forth in claim 6 wherein said deflector member in plan view extends from an 11 o'clock position to a 3 o'clock position with said upstream center line being the reference for determining said o'clock positions based on the center of said opening being the rotative center of said o'clock positions.

* * * * *